(12) United States Patent
Tamate (10) Patent No.: US 8,351,890 B2
(45) Date of Patent: Jan. 8, 2013

(54) COMMUNICATION DEVICE

(75) Inventor: Shuichi Tamate, Tokyo (JP)

(73) Assignee: Kyocera Corporation, Kyoto (JP)

( * ) Notice: Subject to any disclaimer, the term of this patent is extended or adjusted under 35 U.S.C. 154(b) by 247 days.

(21) Appl. No.: 12/745,236

(22) PCT Filed: Nov. 28, 2008

(86) PCT No.: PCT/JP2008/071649
§ 371 (c)(1),
(2), (4) Date: Nov. 3, 2010

(87) PCT Pub. No.: WO2009/069747
PCT Pub. Date: Jun. 4, 2009

(65) Prior Publication Data
US 2011/0039510 A1 Feb. 17, 2011

(30) Foreign Application Priority Data
Nov. 29, 2007 (JP) .............................. P 2007-308897

(51) Int. Cl.
*H04B 1/26* (2006.01)
(52) U.S. Cl. ......................... 455/313; 455/323
(58) Field of Classification Search .......... 455/313–334, 455/255–265
See application file for complete search history.

(56) References Cited

U.S. PATENT DOCUMENTS

| | | | | |
|---|---|---|---|---|
| 7,120,414 B2 * | 10/2006 | Kim et al. | ...................... | 455/333 |
| 7,558,556 B1 * | 7/2009 | Moloudi et al. | .............. | 455/323 |
| 7,783,251 B2 * | 8/2010 | Rofougaran et al. | .......... | 455/260 |
| 8,099,070 B2 * | 1/2012 | Mu et al. | ........................ | 455/323 |
| 2009/0233570 A1 * | 9/2009 | Wang | ............................ | 455/323 |

FOREIGN PATENT DOCUMENTS

| | | |
|---|---|---|
| JP | 2002-290851 | 10/2002 |
| JP | 2004-521534 | 7/2004 |
| JP | 2005-278122 | 10/2005 |
| WO | WO-02/056490 | 7/2002 |

OTHER PUBLICATIONS

International Search Report for PCT/JP2008/071649, mailed on Feb. 24, 2009, 1 page.

* cited by examiner

*Primary Examiner* — Lana N Le
(74) *Attorney, Agent, or Firm* — Duane Morris LLP (57) ABSTRACT

A communication device according to the present invention which receives a reception signal, includes: an intermodulation oscillator that outputs a signal of a first frequency; an adding section that adds together the reception signal and the signal of the first frequency; an intermodulation wave generating section that generates an intermodulation wave signal from the reception signal and the signal of the first frequency that are added together; a local oscillator that outputs a local signal; a mixer that generates an intermediate frequency signal by mixing the local signal into the intermodulation wave signal; a bandpass filter that extracts a signal of a desired frequency from the intermediate frequency signal; a voltage level detection section that detects a voltage level of a desired signal; and a control section that causes the intermodulation oscillator to output the signal of the first frequency when the voltage level of the desired signal is greater than a saturation level of the receiving section, and causes the intermediate frequency signal to be generated by mixing the local signal whose frequency is controlled into the intermodulation wave signal.

4 Claims, 8 Drawing Sheets

COMMUNICATION DEVICE

CROSS-REFERENCE TO RELATED APPLICATIONS

This is a U.S. National Phase Application of International Application No. PCT/JP2008/071649 filed Nov. 28, 2008, which claims priority to Japanese Patent Application No. 2007-308897 filed Nov. 29, 2007, the disclosures of which are incorporated herein by reference in their entirety.

TECHNICAL FIELD

The present invention relates to a communication device.

BACKGROUND ART

Patent document 1 described below discloses a multiband direct conversion wireless communication device that is able to demodulate a desired signal by protecting the desired signal from the effects of interference waves.

In this multiband direct conversion wireless communication device, signals in a plurality of frequency bands are received by a single antenna terminal. These reception signals are supplied from the antenna terminal into a single bandpass filter via a duplexer and a low-noise amplifier (LNA). The reception signals are supplied from the bandpass filter into an I-channel mixer and a Q-channel mixer with differential inputs, and they are then down-converted into baseband signals by local signals supplied to the I-channel mixer and the Q-channel mixer from a local oscillator.

[Patent document 1] Published Japanese Translation No. 2004-521534 of the PCT International Publication

DISCLOSURE OF INVENTION

Problem to be Solved by the Invention

In the above described conventional technology, when a plurality of frequency signals are being received, the voltage levels of the reception signals of the plurality of frequency bands received by a single antenna terminal are uniformly amplified or attenuated. Because the attenuation of the voltage levels of the reception signals is executed using the reception signal having the highest voltage level as a reference, the problem arises that the voltage level of a reception signal having a low voltage level becomes lower than that of the noise level.

In order to solve the above described problem in the conventional technology, technology exists in which, instead of a single bandpass filter, the LNA is connected to a plurality of bandpass filters that are connected in parallel, and the reception signals supplied from the LNA are split into a plurality of frequency bands by this plurality of bandpass filters. The voltage levels are then controlled for these split reception signals. However, because it is not possible to split reception signals that are in adjacent frequency bands in this technology as well, this technology also has the drawback that it is not possible to control the voltage levels individually of a plurality of signals in adjacent frequency bands.

The present invention was conceived in view of the above described circumstances. An object of the present invention is to provide a communication device that individually attenuates the voltage levels of a plurality of signals in adjacent frequencies.

Means for Solving the Problem

In order to achieve the above described objects, a communication device according to the present invention which receives a reception signal, includes: an intermodulation oscillator that outputs a signal of a first frequency; an adding section that adds together the reception signal and the signal of the first frequency; an intermodulation wave generating section that generates an intermodulation wave signal from the reception signal and the signal of the first frequency that are added together; a first local oscillator that outputs a first local signal; a first mixer that generates a first intermediate frequency signal by mixing the first local signal into the intermodulation wave signal; a first bandpass filter that extracts a signal of a first desired frequency from the first intermediate frequency signal; a first voltage level detection section that detects a first voltage level of the signal of the first desired frequency; a second local oscillator that outputs a second local signal; a second mixer that generates a second intermediate frequency signal by mixing the second local signal into the intermodulation wave signal; a second bandpass filter that extracts a signal of a second desired frequency from the second intermediate frequency signal; a second voltage level detection section that detects a second voltage level of the signal of the second desired frequency; and a control section that causes the intermodulation oscillator to output the signal of the first frequency to the adding section when the first voltage level or the second voltage level is greater than a saturation level of the receiving section, the control section causes the first mixer to mix the first local signal whose frequency is controlled by the first local oscillator into the intermodulation wave signal so that the first intermediate frequency signal is generated when the first voltage level is greater than the saturation level of the receiving section, and the control section causes the second mixer to mix the second local signal whose frequency is controlled by the second local oscillator into the intermodulation signal so that the second intermediate frequency signal is generated when the second voltage level is greater than the saturation level of the receiving section.

In the communication device according to the present invention, the control section may cause the intermodulation oscillator to reduce the voltage level of the signal of the first frequency.

In the communication device according to the present invention, the control section may cause the first local oscillator to reduce the voltage level of the first local signal when the first voltage level is greater than the saturation level of the receiving section, and the control section may cause the second local oscillator to reduce the voltage level of the second local signal when the second voltage level is greater than the saturation level of the receiving section.

The communication device of the present invention, may further include a variable ATT (attenuator) that attenuates the reception signal, and the control section may increase the attenuation level of the variable ATT when the first voltage level and the second voltage level are greater than the saturation level of the receiving section.

EFFECT OF THE INVENTION

According to the present invention, the control section that causes the intermodulation oscillator to output the signal of the first frequency to the adding section when the first voltage level or the second voltage level is greater than a saturation level of the receiving section. Moreover, the control section causes the first mixer to mix the first local signal whose frequency is controlled by the first local oscillator into the intermodulation wave signal so that the first intermediate frequency signal is generated when the first voltage level is greater than the saturation level of the receiving section. The control section causes the second mixer to mix the second local signal whose frequency is controlled by the second local oscillator into the intermodulation signal so that the second intermediate frequency signal is generated when the second voltage level is greater than the saturation level of the receiving section. Accordingly, the voltage levels of the signal of the first desired frequency extracted from the first intermediate frequency signal and the signal of the second desired frequency extracted from the second intermediate frequency signal are voltage levels that are dependent on the voltage level of an intermodulation wave signal that has a lower voltage level than that of the reception signal. As a result of this, the voltage levels of signals having adjacent frequencies can be individually attenuated.

REFERENCE SYMBOLS

A: PHS terminal
B1, B2: Base station
1: Receiving section
1a: Antenna
1b: First BPF
1c: LNA
1d: variable ATT
1e: Second BPF
1f: Power synthesis section
1g: Intermodulation oscillator
1h: Amplifier
1i: First mixer
1j: First local oscillator
1k: First intermediate frequency BPF
1l: First voltage level detection section
1m: Second mixer
1n: Second local oscillator
1o: Second intermediate frequency BPF
1p: Second voltage level detection section
1q: Demodulation processing section
2: Transmitting section
2a: Transmitting circuit section
3: Operating section
4: Display section
5: Control section

BEST MODE FOR CARRYING OUT THE INVENTION

Hereinafter, an embodiment of the present invention will be described with reference made to the drawings. The present embodiment relates to a PHS (Personal Handy-phone System) terminal which is one type of mobile terminals.

Figure 1:
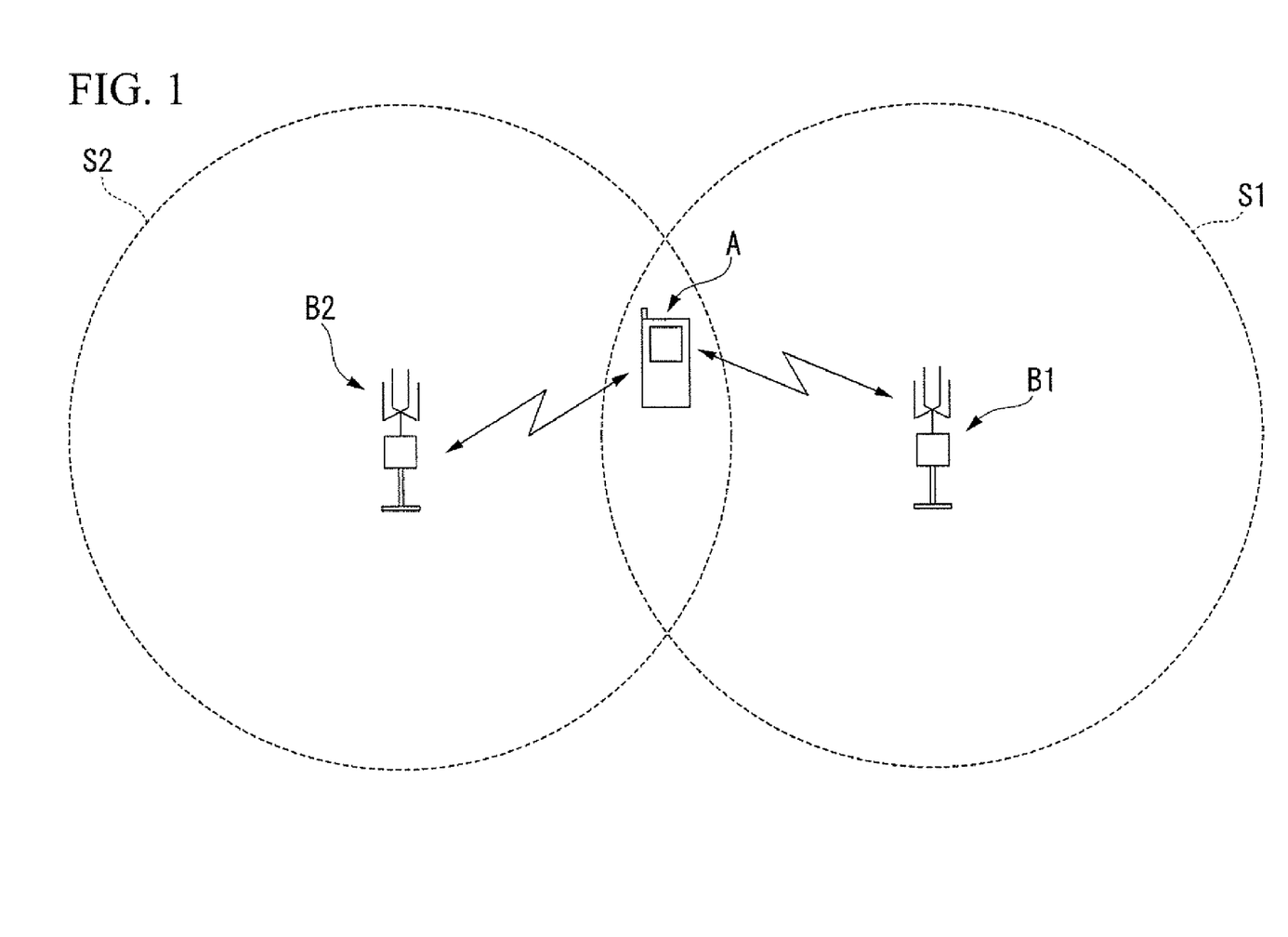
FIG. 1 is a schematic structural view showing a wireless communication system including a PHS terminal according to an embodiment of the present invention.

FIG. 1 is a schematic structural view showing a wireless communication system including a PHS terminal A according to the present embodiment. This wireless communication system is constituted by the PHS terminal A and by base stations B1 and B2.

The PHS terminal A is a communication device that receives signals in a plurality of bands using a common antenna terminal. The PHS terminal A communicates mutually with the respective base stations B1 and B2. The respective base stations B1 and B2 are located discretely a predetermined distance apart. The base stations B1 and B2 perform communication with the PHS terminal A by means of signals in mutually different bands in cells S1 and S2 that have been allocated to each base station.

In FIG. 1, the PHS terminal A is positioned in a location where the cell S1 of the base station B1 and the cell S2 of the base station B2 overlap each other. Namely, the PHS terminal A registers a position to the base station B1, and the PHS terminal A which has established a communication circuit connection between itself and the base station B1 is also in a state where it can perform communication with the base station B2 as well.

Figure 2:
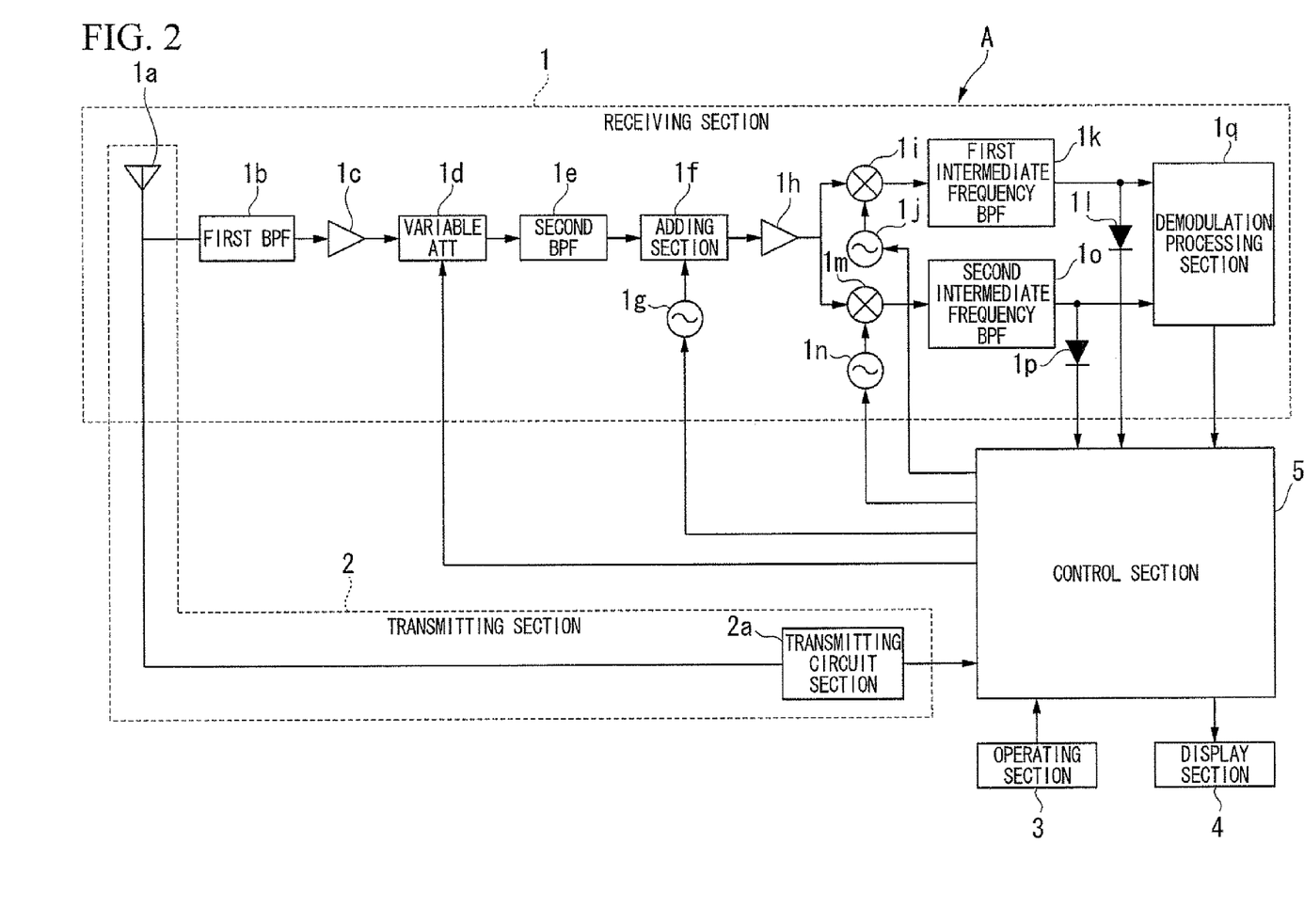
FIG. 2 is a function block diagram showing the functional structure of the PHS terminal according to the embodiment of the present invention.

Next, the functional structure of the PHS terminal A will be described with reference made to FIG. 2. FIG. 2 is a function block diagram showing the functional structure of the PHS terminal A according to the present embodiment.

The PHS terminal A is constituted by a receiving section 1, a transmitting section 2, an operating section 3, a display section 4, and a control section 5. Furthermore, the receiving section 1 is constituted by an antenna 1a, a first BPF (Band Pass Filter) 1b, an LNA (Low Noise Amplifier) 1c, a variable ATT (Attenuator) 1d, a second BPF 1e, an adding section 1f, an intermodulation oscillator 1g, an amplifier 1h, a first mixer 1i, a first local oscillator 1j, a first intermediate frequency BPF 1k, a first voltage level detection section 1l, a second mixer 1m, a second local oscillator 1n, a second intermediate frequency BPF 1o, a second voltage level detection section 1p, and a demodulation processing section 1q. The transmitting section 2 is constituted by the antenna 1a and a transmitting circuit section 2a.

The antenna 1a is a common antenna for both transmitting and receiving signals. This antenna 1a outputs to the first BPF 1b an RF reception signal that contains an RF reception signal F1 of a first high frequency f1 from the base station B1 and an RF reception signal F2 of a second high frequency f2 from the base station B2. The antenna 1a transmits transmission signals supplied from the transmitting circuit section 2a to the base stations B1 and B2.

The first BPF 1b attenuates frequency components other than the first high frequency f1 and the second high frequency f2 from the RF reception signal supplied from the antenna 1a, and outputs the RF reception signal to the LNA 1c.

The LNA 1c is an amplifier having a low noise figure. The LNA 1c amplifies the RF reception signal supplied from the first BPF 1b, and outputs it to the variable ATT 1d.

The variable ATT 1d is an attenuator in which the attenuation level is controlled based on the control of the control section 5. The variable ATT 1d attenuates the voltage level of the RF reception signal supplied from the LNA 1c, and outputs the RF reception signal to the second BPF 1e.

The second BPF 1e attenuates frequency components other than the first high frequency f1 and the second high frequency f2 from the RF reception signal supplied from the ATT 1d, and outputs the RF reception signal to the adding section 1f.

The adding section 1f adds the RF reception signal input from the second BPF 1e to the signal of a frequency f3 input from the intermodulation oscillator 1g, and outputs the RF reception signal and the frequency f3 signal to the amplifier 1h.

The intermodulation oscillator 1g generates the signal of the frequency f3 that causes an intermodulation wave signal in the amplifier 1h together with the RF reception signal, and outputs them to the adding section 1f. This intermodulation oscillator 1g controls the voltage level of the signal of the frequency f3 based on the control of the control section.

The amplifier 1h generates an intermodulation wave signal from the signal of the frequency f3 and the RF reception signal input from the adding section 1f, and amplifies the RF reception signal, the signal of the frequency f3, and the intermodulation wave signal.

The first mixer 1i mixes a first local signal supplied from a first local oscillator 1j in the RF reception signal, the signal of the frequency f3, and the intermodulation wave signal which are supplied from the amplifier 1h so that the RF reception signal, the signal of the frequency f3, and the intermodulation wave signal undergo frequency conversion (i.e., are down-converted) to an IF frequency, and they are output to the first intermediate frequency BPF 1k as a first IF reception signal, a signal of a first IF frequency, and a first IF intermodulation wave signal.

The first local oscillator 1j generates a first local signal for the IF frequency conversion, and outputs this signal to the first mixer 1i. This first local oscillator 1j controls the frequency of the first local signal based on the control of the control section 5.

The first intermediate frequency BPF 1k attenuates signals of frequencies other than the IF reception signal IF1 of a first intermediate frequency if1 which is an intermediate frequency signal of the RF reception signal F1 from the first IF reception signal, the signal of the first IF frequency, and the first IF intermodulation wave signal, and outputs the IF reception signal IF1 to the first voltage level detection section 1l and the demodulation processing section 1q.

The first voltage level detection section 1l detects the voltage level of the IF reception signal IF1, and outputs a first voltage level detection signal which shows the voltage level of the IF reception signal IF1 to the control section 5.

The second mixer 1m mixes a second local signal supplied from a second local oscillator 1n in the RF reception signal, the signal of the frequency f3, and the intermodulation wave signal which are input from the amplifier 1h so that the RF reception signal, the signal of the frequency f3, and the intermodulation wave signal undergo frequency conversion (i.e., are down-converted) to an IF frequency, and they are output to a second intermediate frequency BPF 1o as a second IF reception signal, a signal of a second IF frequency, and a second IF intermodulation wave signal.

The second local oscillator 1n generates a second local signal for the IF frequency conversion, and outputs this signal to the second mixer 1m. This second local oscillator 1n controls the frequency of the second local signal based on the control of the control section 5.

The second intermediate frequency BPF 1o attenuates signals of frequencies other than the IF reception signal IF2 of a second intermediate frequency if2 which is an intermediate frequency signal of the RF reception signal F2 from the second IF reception signal, the signal of the second IF frequency, and the second IF intermodulation wave signal, and outputs the IF reception signal IF2 to the second voltage level detection section 1p and the demodulation processing section 1q.

The second voltage level detection section 1p detects the voltage level of the IF reception signal IF2, and outputs a second voltage level detection signal which shows the voltage level of the IF reception signal IF2 to the control section 5.

The demodulation processing section 1q performs processing such as A/D conversion and digital demodulation and the like on the IF reception signal IF1 input from the first intermediate frequency BPF 1j, and outputs it to the control section 5 as a baseband signal. Moreover, the demodulation processing section 1q also performs the same type of processing as it performs on the IF reception signal IF1 on the IF reception signal IF2 input from the second intermediate frequency BPF 1n, and outputs it to the control section 5 as a baseband signal.

The transmitting circuit section 2a outputs transmission signals to the antenna 1a under the control of the control section 5.

The operating section 3 is constituted from various types of operating keys such as a power-on key, numeric keys, and various types of function keys. The operating section 3 outputs operating commands from a user made on these operating keys to the control section 5.

The display section 4 is, for example, a liquid crystal monitor or an organic EL monitor or the like. The display section 4 displays various types of screens made up of images and characters based on signals input from the control section 5.

The control section 5 is constituted by internal memory which is constituted by a CPU (Central Processing Unit), ROM (Read Only Memory), and RAM (Random Access Memory), and interface circuits which perform signal input and output with the above described receiving section 1, transmitting section 2, operating section 3, and display section, and the like. The control section 5 controls the overall operations of the PHS terminal A based on a control program stored in the ROM, signals received by the receiving section 1, and operating commands received by the operating section 3. The control program stored in the ROM includes a voltage level attenuation program, and the control section 5 executes voltage level attenuation processing based on this voltage level attenuation program. Details of the voltage level attenuation processing executed by the control section 5 are described below as an operation of the PHS terminal A.

Figure 3:
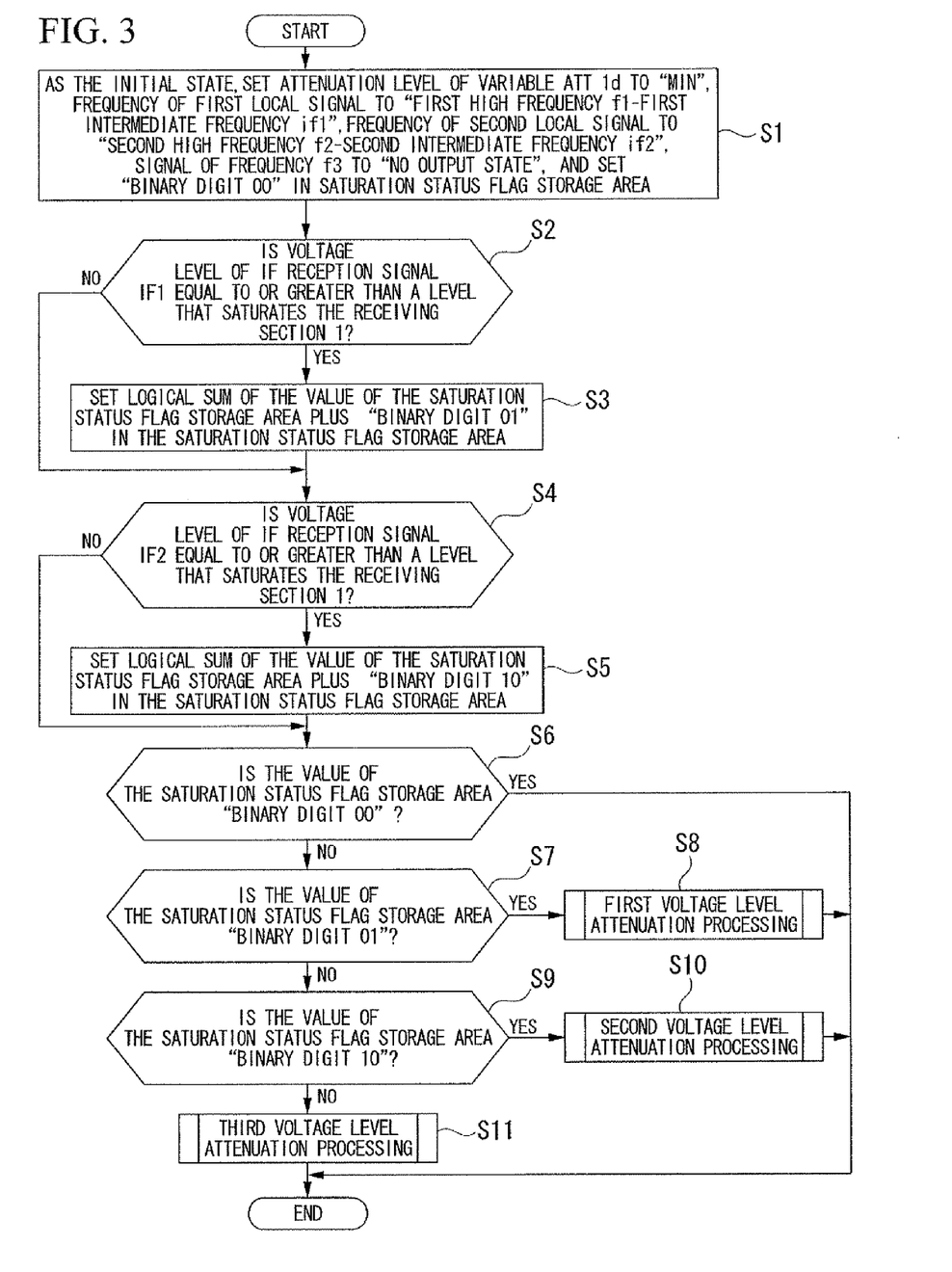
FIG. 3 is a flowchart showing an operation of the PHS terminal according to the embodiment of the present invention.

Next, operations of the PHS terminal A which has the above described structure will be described in detail with reference made to FIG. 3. FIG. 3 is a flowchart showing an operation of the PHS terminal A according to the present embodiment.

The control section 5 makes the following settings as initial settings (step S1). The attenuation level of the variable ATT 1d is set to "minimum". The frequency of the first local signal output by the first local oscillator 1*j* is set to "(first high frequency f1)−(first intermediate frequency if1)". The frequency of the second local signal output by the second local oscillator is set to "(second high frequency f2)−(second intermediate frequency if2)". The signal of the frequency f3 is set to "no output" with respect to the intermodulation oscillator 1*g*. A saturation status flag storage area is provided in the RAM and "binary digit 00" is set in this saturation status flag storage area.

If "binary digit 00" is set in the saturation status flag storage area, then this shows that the voltage levels of the IF reception signal IF1 and the IF reception signal IF2 are less than a level that saturates the receiving section 1. If "binary digit 01" is set in this area, then this shows that the voltage level of the IF reception signal IF1 is equal to or greater than a level that saturates the receiving section 1. If "binary digit 10" is set in this area, then this shows that the voltage level of the IF reception signal IF2 is equal to or greater than a level that saturates the receiving section 1. If "binary digit 11" is set in this area, then this shows that the voltage levels of both the IF reception signal IF1 and the IF reception signal IF2 are equal to or greater than a level that saturates the receiving section 1.

The control section 5 determines whether or not the voltage level of the IF reception signal IF1 is equal to or greater than a level that saturates the receiving section 1 based on first voltage level detection signals supplied from the first voltage level detection section 1*l* as a result of the RF reception signal being received by the receiving section 1 (step S2). If it is determined to 'Yes' in step S2, namely, if it is determined that the voltage level of the IF reception signal IF1 is equal to or greater than a level that saturates the receiving section 1, the control section 5 sets a logical sum of the value of the saturation status flag storage area and the "binary digit 01" in the saturation status flag storage area (step S3). Next, the control section 5 determines whether or not the voltage level of the IF reception signal IF2 is equal to or greater than a level that saturates the receiving section 1 based on the second voltage level detection signal (step S4). In contrast, if it is determined to 'No' in step S2, namely, if it is determined that the voltage level of the IF reception signal IF1 is less than a level that saturates the receiving section 1, the control section 5 executes step S4 without executing step S3.

If it is determined to 'Yes' in step S4, namely, if it is determined that the voltage level of the IF reception signal IF2 is equal to or greater than a level that saturates the receiving section 1, the control section 5 sets a logical sum of the value of the saturation status flag storage area and the "binary digit 10" in the saturation status flag storage area (step S5). Next, the control section 5 determines whether or not the value of the saturation status flag storage area is "binary digit 00" (step S6). In contrast, if it is determined to 'No' in step S4, namely, if it is determined that the voltage level of the IF reception signal IF2 is less than a level that saturates the receiving section 1, the control section 5 executes step S6 without executing step S5.

If it is determined to 'Yes' in step S6, namely, if the value of the saturation status flag storage area is "binary digit 00", the control section 5 ends the operation. In contrast, if it is determined to 'No' in step S6, namely, if the value of the saturation status flag storage area is not "binary digit 00" the control section 5 determines whether or not the value of the saturation status flag storage area is "binary digit 01" (step S7). If it is determined to 'Yes' in step S7, namely, if the value of the saturation status flag storage area is "binary digit 01", the control section 5 executes first voltage level attenuation processing (step S8). In contrast, if it is determined to 'No' in step S7, namely, if the value of the saturation status flag storage area is not "binary digit 01", the control section 5 determines whether or not the value of the saturation status flag storage area is "binary digit 10" (step S9). If it is determined to 'Yes' in step S9, namely, if the value of the saturation status flag storage area is "binary digit 10", the control section 5 executes second voltage level attenuation processing (step S10). In contrast, if it is determined to 'No' in step S9, namely, if the value of the saturation status flag storage area is 'binary digit 11', the control section 5 executes third voltage level attenuation processing (step S11).

Figure 4:
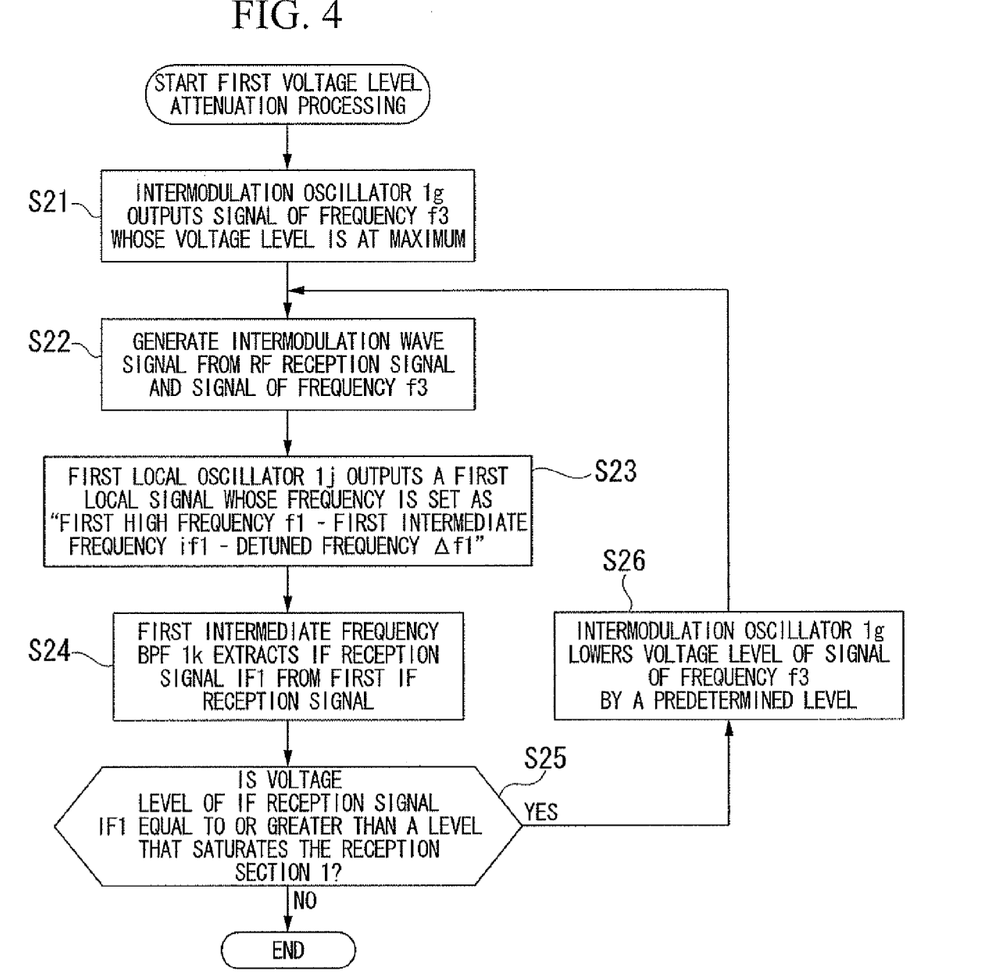
FIG. 4 is a flowchart showing first voltage level attenuation processing for attenuating the voltage level of an IF signal IF1 of the PHS terminal according to the embodiment of the present invention.

Hereinafter, the first voltage level attenuation processing of the above described step S8 will be described in detail with reference made to FIG. 4. FIG. 4 is a flowchart showing the first voltage level attenuation processing for attenuating the voltage level of the IF signal IF1.

The control section 5 causes the intermodulation oscillator 1*g* to output the signal of the frequency f3 in which the voltage level has been set to the maximum to the adding section 1*f* (step S21).

The adding section 1*f* adds the signal of the frequency f3 to the RF reception signal and outputs them to the amplifier 1*h*.

The amplifier 1*h* generates an intermodulation wave signal from the RF reception signal and the signal of the frequency f3 which have been input from the adding section 1*f*, and outputs the RF reception signal, the signal of the frequency f3, and the intermodulation wave signal to the first mixer 1*i* and the second mixer (step S22).

The control section 5 determines a detuned frequency Δf1 of the first high frequency f1 and the frequency f3. Furthermore, the control section 5 causes the first local oscillator 1*j* to output a first local signal whose frequency is set to "(first high frequency f1)−(first intermediate frequency if1)−(detuned frequency Δf1)" to the first mixer 1*i* (step S23).

The first mixer 1*i* generates a first IF reception signal by mixing the RF reception signal, the signal of the frequency f3, and the intermodulation wave signal with the first local signal. The first intermediate frequency BPF 1*k* attenuates frequency components other than the first intermediate frequency if1 from this first IF reception signal, and extracts the IF reception signal IF1 which is the intermediate frequency signal of the RF reception signal F1 (step S24).

The processing of step S22 through step S24 will now be described in detail with reference made to FIG. 7.

Figure 7:
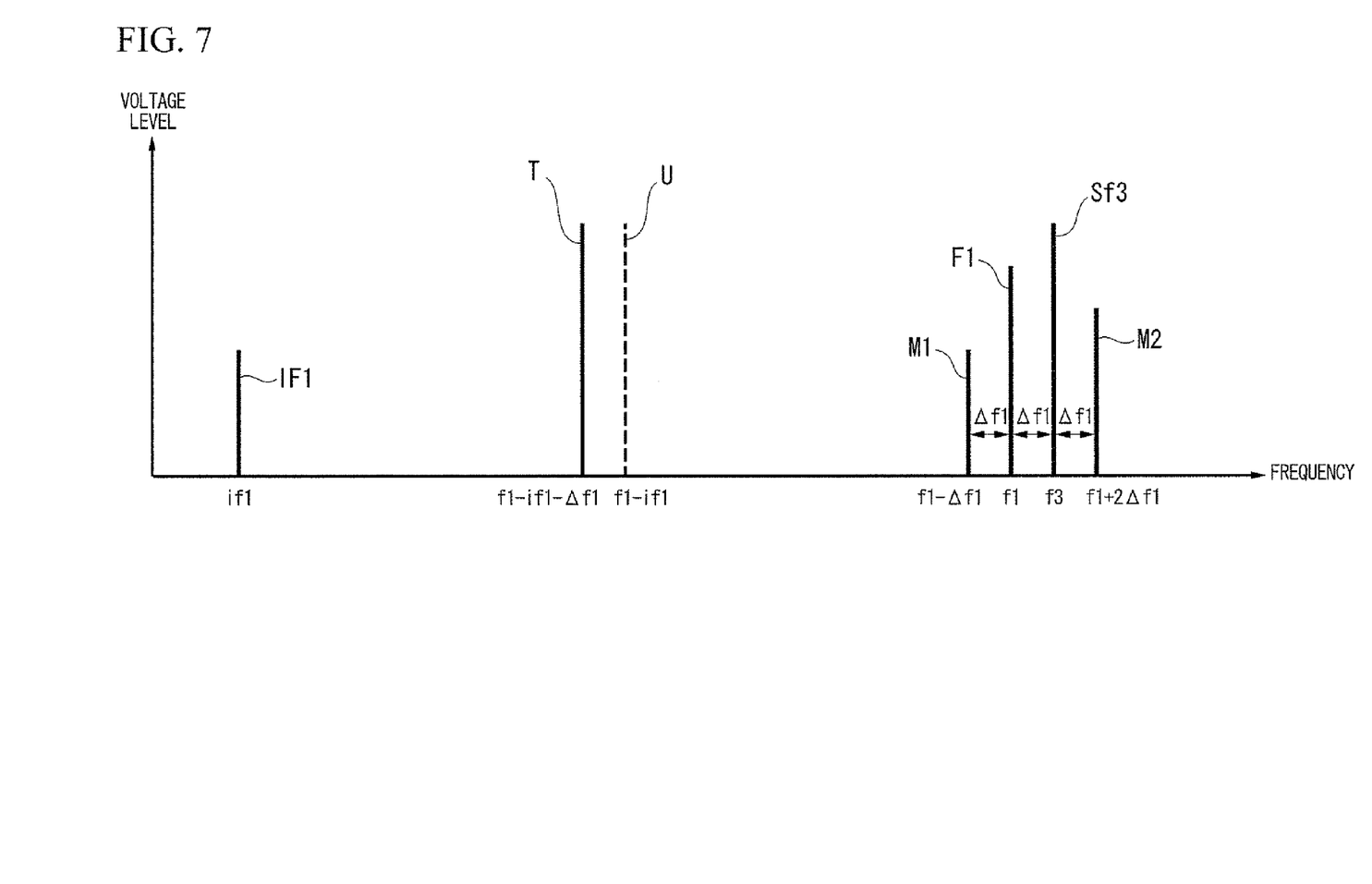
FIG. 7 is a schematic view showing relationships between an RF reception signal F1, the signal of a frequency f3, primary intermodulation wave signals M1 and M2 generated by the RF reception signal F1 and the signal of the frequency f3, a first local signal, and an IF reception signal IF1 of the PHS terminal according to the embodiment of the present invention.

FIG. 7 is a schematic view showing relationships between an RF reception signal F1, the signal of a frequency f3, primary intermodulation wave signals M1 and M2 generated by the RF reception signal F1 and the signal of the frequency f3, a first local signal, and an IF reception signal IF1.

In step S22, as is shown in FIG. 7, an intermodulation wave signal is generated by the signal of the frequency f3 (reference symbol Sf3 in FIG. 7) and the RF reception signal F1 of the first high frequency f1 contained in the RF reception signal. In FIG. 7, only the primary intermodulation wave signals from among the intermodulation wave signals are shown. A primary intermodulation wave signal M1 in which the frequency is "(first high frequency f1)−(detuned frequency Δf1)" and a primary intermodulation wave signal M2 in which the frequency is "(first high frequency f1)+2×(detuned frequency Δf1)" are generated as the primary intermodulation wave signals.

In step S23, as a result of the first mixer 1*i* mixing a first local signal (shown by the reference symbol T in FIG. 7) output from the first local oscillator 1*j* in which the frequency is "(first high frequency f1)−(first intermediate frequency if1)−(detuned frequency Δf1)" with the primary intermodulation wave signal M1 "(first high frequency f1)−(detuned frequency Δf1)", the IF reception signal IF1 shown in FIG. 7 that is extracted by the first intermediate frequency BPF 1k in step S24 is generated. In FIG. 7, the reference symbol U shows the first local signal which is output by the first local oscillator 1j in step S1.

The control section 5 determines whether or not the voltage level of the IF reception signal IF1 is equal to or greater than a level that saturates the receiving section 1 based on the first voltage level detection signal input from the first voltage level detection section 1l (step S25). If it is determined to 'No' in step S25, namely, if the voltage level of the IF reception signal IF1 is less than a level that saturates the receiving section 1, the control section 5 ends the routine. In contrast, if it is determined to 'Yes' in step S25, namely, if the voltage level of the IF reception signal IF1 is equal to or greater than a level that saturates the receiving section 1, the control section 5 lowers the voltage level of the signal of the frequency f3 output by the intermodulation oscillator 1g by a predetermined level (step S26), and the routine moves to step S22.

Figure 8:
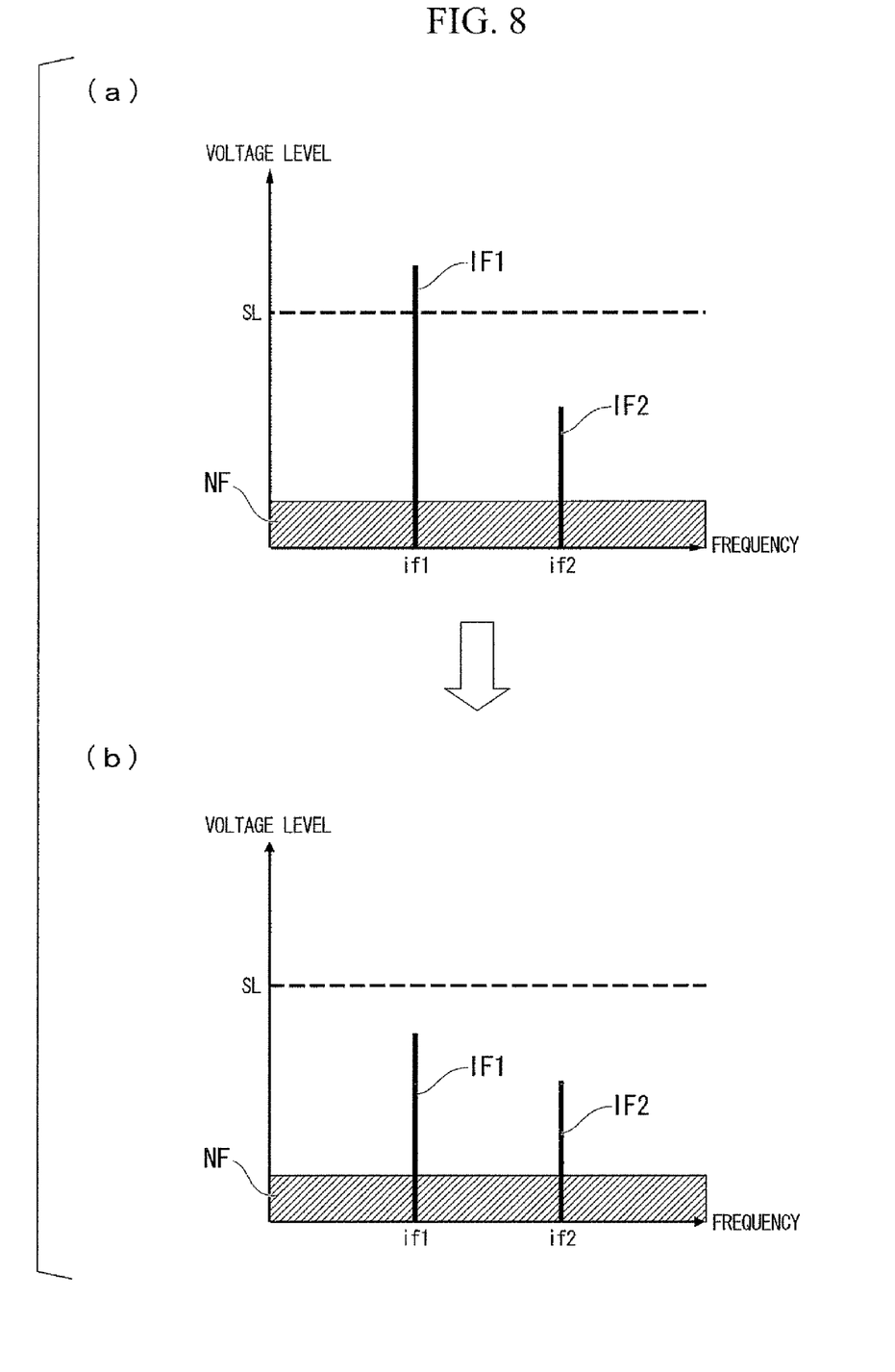
FIG. 8 is a schematic view showing the voltage levels of the IF reception signal IF1 prior to the first voltage level attenuation processing and after the first voltage level attenuation processing in the PHS terminal according to the embodiment of the present invention.

FIG. 8 is a schematic view showing the voltage level of the IF reception signal IF1 prior to the first voltage level attenuation processing (section (a) of FIG. 8) and after the first voltage level attenuation processing (section (b) of FIG. 8). In sections (a) and (b) of FIG. 8, the diagonal line portions show a noise floor NF. In the first voltage level attenuation processing, the IF reception signal IF1 is generated from an intermodulation wave whose voltage level is lower than that of the RF reception signal F1. As a result of this first voltage level attenuation processing, the voltage level of the IF reception signal IF1 which is equal or greater than a saturation level SL of the receiving section 1 prior to the first voltage level attenuation processing shown in section (a) of FIG. 8 can be set to the voltage level of the IF reception signal IF1 shown in section (b) of FIG. 8 which is less than a level that saturates the receiving section 1 without the voltage level of the IF reception signal IF2 being lowered.

Figure 5:
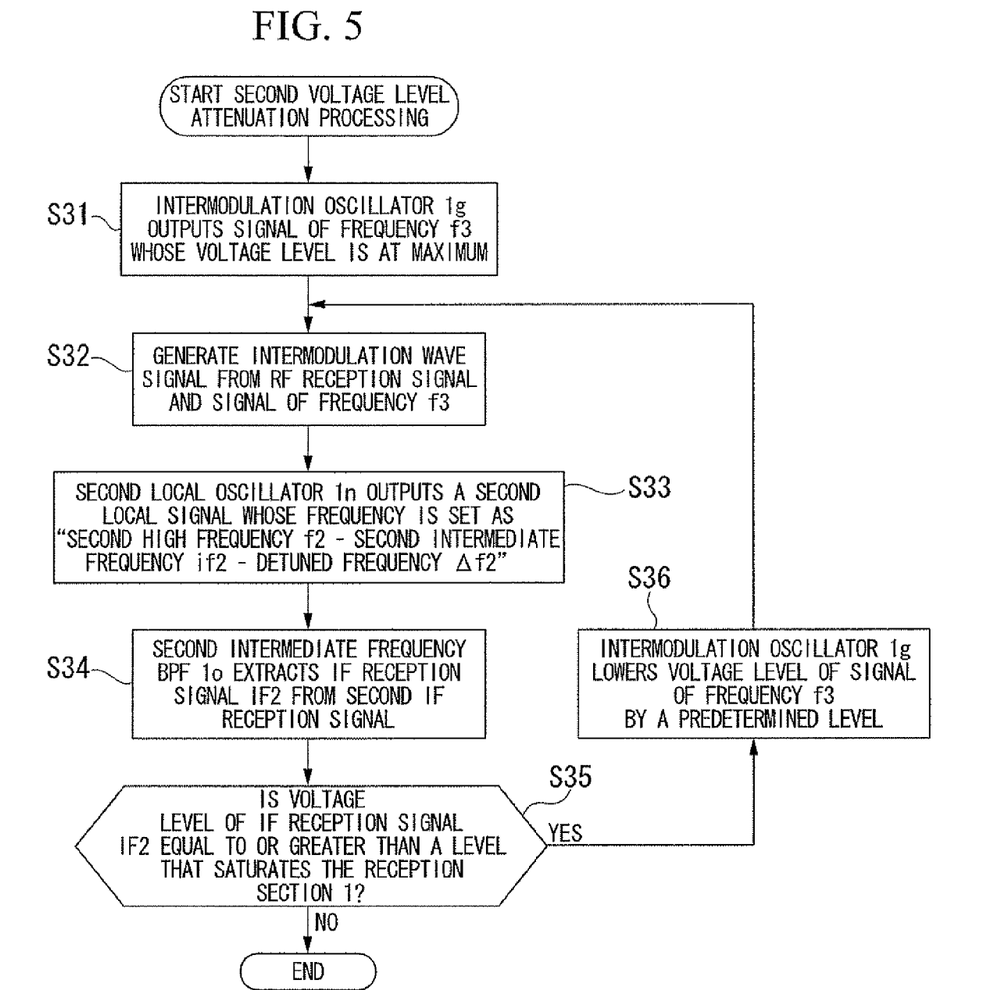
FIG. 5 is a flowchart showing second voltage level attenuation processing for attenuating the voltage level of an IF signal IF2 of the PHS terminal according to the embodiment of the present invention.

Hereinafter, the second voltage level attenuation processing of step S10 will be described in detail with reference made to FIG. 5. FIG. 5 is a flowchart showing second voltage level attenuation processing for attenuating the voltage level of the IF signal IF2.

Note that the processing of step S31 is the same as that of step S21, and the processing of step S32 is the same as that of step S22 and, therefore, a description thereof is omitted.

The control section 5 determines a detuned frequency Δf2 of the second high frequency f2 and the frequency f3. Furthermore, the control section 5 causes the second local oscillator 1n to output to the second mixer 1m a second local signal whose frequency is set to "(second high frequency f2)−(Second intermediate frequency if2)−(detuned frequency Δf2)" (step S33).

The second mixer 1m generates a second IF reception signal by mixing the RF reception signal, the signal of the frequency f3, and the intermodulation wave signal with the second local signal. The second intermediate frequency BPF to attenuates frequency components other than the second intermediate frequency if2 from this second IF reception signal, and extracts the IF reception signal IF2 (step S34).

The control section 5 determines whether or not the voltage level of the IF reception signal IF2 is equal to or greater than a level that saturates the receiving section 1 based on the second voltage level detection signal input from the second voltage level detection section 1p (step S35). If it is determined to 'No' in step S35, namely, if the voltage level of the IF reception signal IF2 is less than a level that saturates the receiving section 1, the control section 5 ends the routine. In contrast, if it is determined to 'Yes' in step S35, namely, if the voltage level of the IF reception signal IF2 is equal to or greater than a level that saturates the receiving section 1, in the same way as the above described step S26, the control section 5 lowers the voltage level of the signal of the frequency f3 output by the intermodulation oscillator 1g by a predetermined level (step S36), and the routine moves to step S32.

Figure 6:
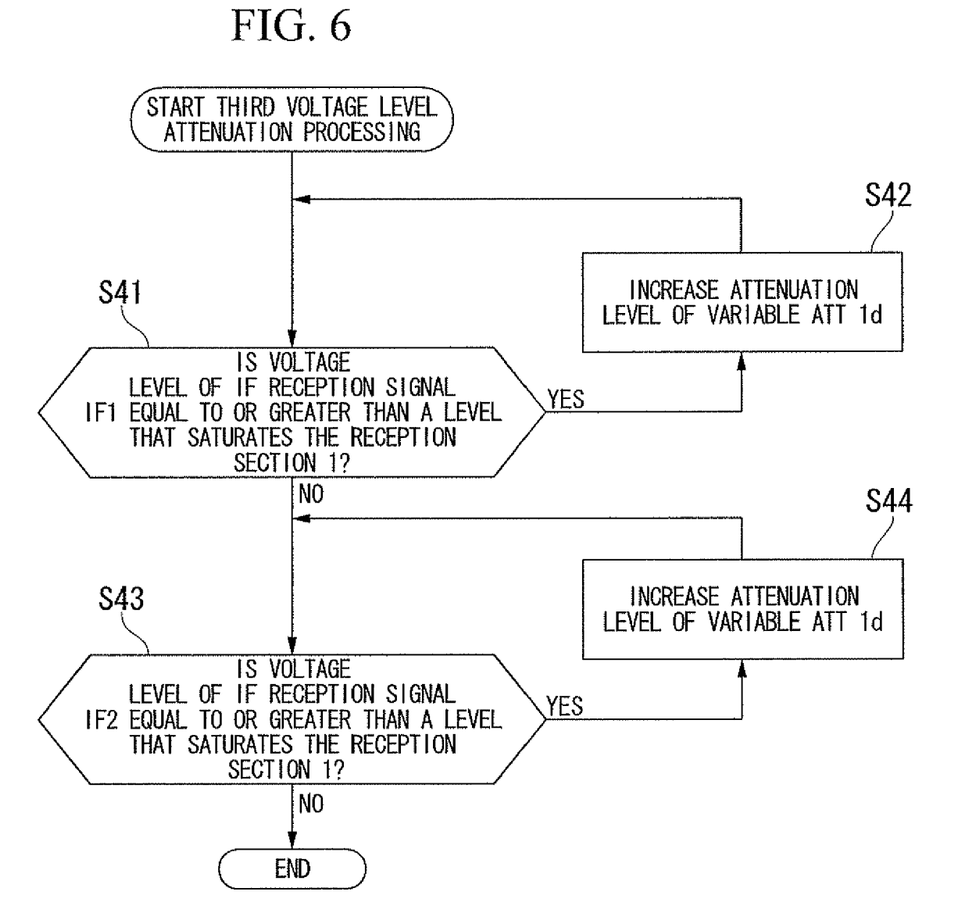
FIG. 6 is a flowchart showing third voltage level attenuation processing for attenuating the voltage levels of the IF signal IF1 and the IF signal IF2 of the PHS terminal according to the embodiment of the present invention.

Hereinafter, the third voltage level attenuation processing of step S11 will be described in detail with reference made to FIG. 6. FIG. 6 is a flowchart showing third voltage level attenuation processing for attenuating the voltage levels of the IF signal IF1 and the IF signal IF2.

The control section 5 determines whether or not the voltage level of the IF reception signal IF1 is equal to or greater than a level that saturates the receiving section 1 based on the first voltage level detection signal (step S41). If it is determined to 'Yes' in step S41, namely, if the voltage level of the IF reception signal IF1 is equal to or greater than a level that saturates the receiving section 1, the control section 5 increases the attenuation level of the variable ATT 1d (step S42). In contrast, if it is determined to 'No' in step S41, namely, if the voltage level of the IF reception signal IF1 is less than a level that saturates the receiving section 1, the control section 5 determines whether or not the voltage level of the IF reception signal IF2 is equal to or greater than a level that saturates the receiving section 1 based on the second voltage level detection signal (step S43).

If it is determined to 'Yes' in step S43, namely, if the voltage level of the IF reception signal IF2 is equal to or greater than a level that saturates the receiving section 1, the control section 5 increases the attenuation level of the variable ATT 1d (step S44). In contrast, if it is determined to 'No' in step S43, namely, if the voltage level of the IF reception signal IF2 is less than a level that saturates the receiving section 1, the control section 5 ends the routine.

As is described above, in the PHS terminal A, when the voltage level of the IF reception signal IF1 or the voltage level of the IF reception signal IF2 is greater than the saturation level of the receiving section 1, the control section 5 causes the intermodulation oscillator 1g to output the signal of the frequency f3 to the adding section 1f. In addition, when the voltage level of the IF reception signal IF1 is greater than the saturation level of the receiving section 1, the first mixer 1i mixes a first local signal in which the frequency is controlled into an intermodulation wave signal, so that a first IF reception signal is generated. Moreover, when the voltage level of the IF reception signal IF2 is greater than the saturation level of the receiving section 1, the second mixer 1m mixes a second local signal in which the frequency is controlled into an intermodulation wave, so that a second IF reception signal is generated. As a result of this, because the voltage levels of the IF reception signal IF1 extracted from the first IF reception signal and the IF reception signal IF2 extracted from the second IF reception signal are voltage levels that are dependent on the voltage level of an intermodulation wave signal that has a lower voltage level than that of the received fundamental wave, the voltage levels of signals having adjacent frequencies can be individually attenuated.

The embodiment of the present invention has been described above, however, the present invention is not limited to the above embodiment and, for example, the following variations may be considered.

In the above described embodiment, the voltage level of the IF reception signal IF1 or the IF reception signal IF2 is attenuated by reducing the voltage level of the signal of the frequency f3 output by the intermodulation oscillator 1g. However, the present invention is not limited to this.

Instead of reducing the voltage level of the signal of the frequency f3, it is also possible to attenuate the voltage level of the IF reception signal IF1 or the IF reception signal IF2 by reducing the voltage levels of the first local signal output from the first local oscillator 1j and the second local signal output from the second local oscillator 1n.

INDUSTRIAL APPLICABILITY

The present invention can be applied to a communication device. According to this communication device, it is possible to individually attenuate the voltage levels of a plurality of signals having adjacent frequencies.

The invention claimed is:

1. A communication device that receives a reception signal, comprising:
- an intermodulation oscillator that outputs a signal of a first frequency;
- an adding section that adds together the reception signal and the signal of the first frequency;
- an intermodulation wave generating section that generates an intermodulation wave signal from the reception signal and the signal of the first frequency that are added together;
- a first local oscillator that outputs a first local signal;
- a first mixer that generates a first intermediate frequency signal by mixing the first local signal into the intermodulation wave signal;
- a first bandpass filter that extracts a signal of a first desired frequency from the first intermediate frequency signal;
- a first voltage level detection section that detects a first voltage level of the signal of the first desired frequency;
- a second local oscillator that outputs a second local signal;
- a second mixer that generates a second intermediate frequency signal by mixing the second local signal into the intermodulation wave signal;
- a second bandpass filter that extracts a signal of a second desired frequency from the second intermediate frequency signal;
- a second voltage level detection section that detects a second voltage level of the signal of the second desired frequency; and
- a control section that causes the intermodulation oscillator to output the signal of the first frequency to the adding section when the first voltage level or the second voltage level is greater than a saturation level of the receiving section, the control section causing the first mixer to mix the first local signal whose frequency is controlled by the first local oscillator into the intermodulation wave signal so that the first intermediate frequency signal is generated when the first voltage level is greater than the saturation level of the receiving section, the control section causing the second mixer to mix the second local signal whose frequency is controlled by the second local oscillator into the intermodulation signal so that the second intermediate frequency signal is generated when the second voltage level is greater than the saturation level of the receiving section.

2. The communication device according to claim 1, wherein the control section causes the intermodulation oscillator to reduce the voltage level of the signal of the first frequency.

3. The communication device according to claim 1, wherein the control section causes the first local oscillator to reduce the voltage level of the first local signal when the first voltage level is greater than the saturation level of the receiving section, and the control section causes the second local oscillator to reduce the voltage level of the second local signal when the second voltage level is greater than the saturation level of the receiving section.

4. The communication device according to claim 1, further comprising a variable ATT (attenuator) that attenuates the reception signal,
wherein the control section increases the attenuation level of the variable ATT when the first voltage level and the second voltage level are greater than the saturation level of the receiving section.

* * * * *